United States Patent
Radhakrishnan et al.

(10) Patent No.: US 11,303,207 B2
(45) Date of Patent: Apr. 12, 2022

(54) METHOD AND APPARATUS FOR ADJUSTING A VOLTAGE REGULATION SETPOINT OF A POWER CONVERTER

(71) Applicant: Infineon Technologies Austria AG, Villach (AT)

(72) Inventors: Jayadevan Radhakrishnan, San Jose, CA (US); Danny Clavette, Greene, RI (US)

(73) Assignee: Infineon Technologies Austria AG, Villach (AT)

( * ) Notice: Subject to any disclaimer, the term of this patent is extended or adjusted under 35 U.S.C. 154(b) by 170 days.

(21) Appl. No.: 16/740,581

(22) Filed: Jan. 13, 2020

(65) Prior Publication Data
US 2021/0218334 A1   Jul. 15, 2021

(51) Int. Cl.
*H02M 3/158*   (2006.01)
*H02M 3/157*   (2006.01)

(52) U.S. Cl.
CPC ........... *H02M 3/157* (2013.01); *H02M 3/158* (2013.01)

(58) Field of Classification Search
CPC ............ H02M 1/0016; H02M 1/0019; H02M 1/0025; H02M 1/08; H02M 1/088; H02M 3/156; H02M 3/1566; H02M 3/157; H02M 3/158; H02M 3/1584
See application file for complete search history.

(56) References Cited

U.S. PATENT DOCUMENTS

| | | | |
|---|---|---|---|
| 8,629,666 B2 * | 1/2014 | Carroll | H02M 3/1588 323/282 |
| 9,857,854 B2 * | 1/2018 | Zhang | G06F 1/26 |
| 10,224,805 B1 * | 3/2019 | Young | H02M 3/33507 |
| 10,530,352 B1 * | 1/2020 | Morici | H02M 3/157 |
| 2016/0233766 A1 * | 8/2016 | Todorov | H02M 3/1584 |
| 2017/0077819 A1 | 3/2017 | Andres | |
| 2020/0007021 A1 * | 1/2020 | Chen | H02M 3/1588 |

OTHER PUBLICATIONS

"Enpirion® Power Datasheet EC7401QI 4-Phase PWM Controller with 8-Bit DAC Code", www.altera.com; DS 1045 Datasheet, Mar. 14, 2014, pp. 1-44.
"Infineon manufactures industry's first true 1000 A voltage regulator solution for next generation AI and 5G networking", Infineon Market News, Mar. 22, 2019, accessed online at https://www.infineon.com/cms/en/about-infineon/press/market-news/2019/INFPMM201903-052.html on Jan. 20, 2020.

* cited by examiner

*Primary Examiner* — Matthew V Nguyen
(74) *Attorney, Agent, or Firm* — Murphy, Bilak & Homiller, PLLC

(57) ABSTRACT

A method of controlling a power converter includes: generating a modulation signal for controlling a phase current of a power stage of the power converter such that an output voltage of the power converter follows a load line having a slope that determines a rate of change of the output voltage as a function of load current; receiving a signal which indicates a target voltage regulation setpoint; and overriding the load line when the signal is active, such that the output voltage follows the target voltage regulation setpoint instead of the load line when the signal is present at the interface.

20 Claims, 9 Drawing Sheets

METHOD AND APPARATUS FOR ADJUSTING A VOLTAGE REGULATION SETPOINT OF A POWER CONVERTER

BACKGROUND

The slope of the load line of a power converter determines the rate of change of the power converter output voltage as a function of load current. The load line may be linear or non-linear. In either case, in many applications it may be beneficial to adjust or modify the load line behavior of a power converter. For example, in the context of an Ethernet router that processes network packets, the Ethernet router consumes less current when idle (no packets passing through the router). The current load of the Ethernet router increases substantially when processing packets. It may be beneficial for the power converter powering the Ethernet router to set the output voltage to a higher static level when the Ethernet router is idle and to follow a defined load line when the Ethernet router is processing packets. Conventionally, such behavior is implemented using a controller having a non-linear load line. Controllers with a static (fixed) load line do not have such flexibility and instead have a fixed voltage regulation setpoint.

Thus, there is a need for an improved method and apparatus for adjusting the voltage regulation setpoint of a power converter.

SUMMARY

According to an embodiment of a controller for a power converter, the controller comprises: a plurality of output terminals, each output terminal configured to output a modulation signal for controlling a phase current of a power stage of the power converter; a modulator configured to generate the modulation signals such that an output voltage of the power converter follows a load line having a slope that determines a rate of change of the output voltage as a function of load current; an interface configured to receive a signal which indicates a target voltage regulation setpoint; and circuitry configured to override the load line when the signal is present at the interface, such that the output voltage follows the target voltage regulation setpoint instead of the load line when the signal is present at the interface.

According to an embodiment of a method of controlling a power converter, the method comprises: generating a modulation signal for controlling a phase current of a power stage of the power converter such that an output voltage of the power converter follows a load line having a slope that determines a rate of change of the output voltage as a function of load current; receiving a signal which indicates a target voltage regulation setpoint; and overriding the load line when the signal is active, such that the output voltage follows the target voltage regulation setpoint instead of the load line when the signal is present at the interface.

According to an embodiment of an electronic system, the electronic system comprises: a load; and a power converter configured to regulate an output voltage provided to the load, the power converter comprising a plurality of power stages each configured to provide a phase current to the load, and a controller configured to generate a modulation signal for controlling the phase current of each power stage such that the output voltage follows a load line having a slope that determines a rate of change of the output voltage as a function of load current, wherein the controller is configured to receive a signal from the load which indicates a target voltage regulation setpoint, wherein the controller is configured to override the load line when the signal is present at the interface, so that the output voltage follows the target voltage regulation setpoint instead of the load line when the signal is present at the interface.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

The embodiments described provide an apparatus and method for adjusting the voltage regulation setpoint of a power converter. The output voltage of the power converter follows a default load line having a slope that determines a rate of change of the output voltage as a function of load current. A signal received by a controller of the power converter indicates a target voltage regulation setpoint. The controller overrides the default load line when the signal is active, such that the output voltage follows the target voltage regulation setpoint instead of the default load line when the signal is present. The controller may be analog, digital or some combination of both. The controller may implement a fixed or variable default load line as part of the voltage regulation process and which is overridden by adjusting the voltage regulation setpoint for the output voltage based on the target voltage regulation setpoint indicated by the signal received at the controller of the power converter.

The term "power converter" as used herein broadly refers to any type of power converter or voltage regulator (VR) that provides one or more regulated voltages to one or more electronic loads such as an Ethernet switch, an ASIC (application-specification integrated circuit), a memory device, a processor such as a central processing unit (CPU), microprocessor, graphics processing unit (GPU), digital signal processor (DSP), artificial intelligence (AI) accelerator, image processor, network or packet processor, coprocessor, multi-core processor, front-end processor, baseband processor, etc. For example, the power converter may be a buck converter, a boost converter, a buck-boost converter, a switched capacitor voltage regulator, a step-down converter, etc. The power converter may be implemented as a power device module.

The term "power device module" as used herein means a packaged functional assembly that includes at least one power switch of a power stage used in converting a voltage from one level to another level, e.g., as is done in power conversion and voltage regulation. The power device module may also include a driver circuit for driving the at least one power switch. The power device module may additionally include a controller for controlling the driver circuit so as to implement the power converter. The controller and/or driver functionality may instead be implemented outside the power device module. The driver circuit for the at least one power switch included in the power device module also may be outside the power device module. Various passive components such as capacitors and/or inductors that make up the power converter may be included in the power device module, surface mounted to the power device module, located on a separate board, etc. Described next in more detail are various embodiments of the power converter, a method of controlling the power converter, and an electronic system that includes the power converter.

Figure 1:
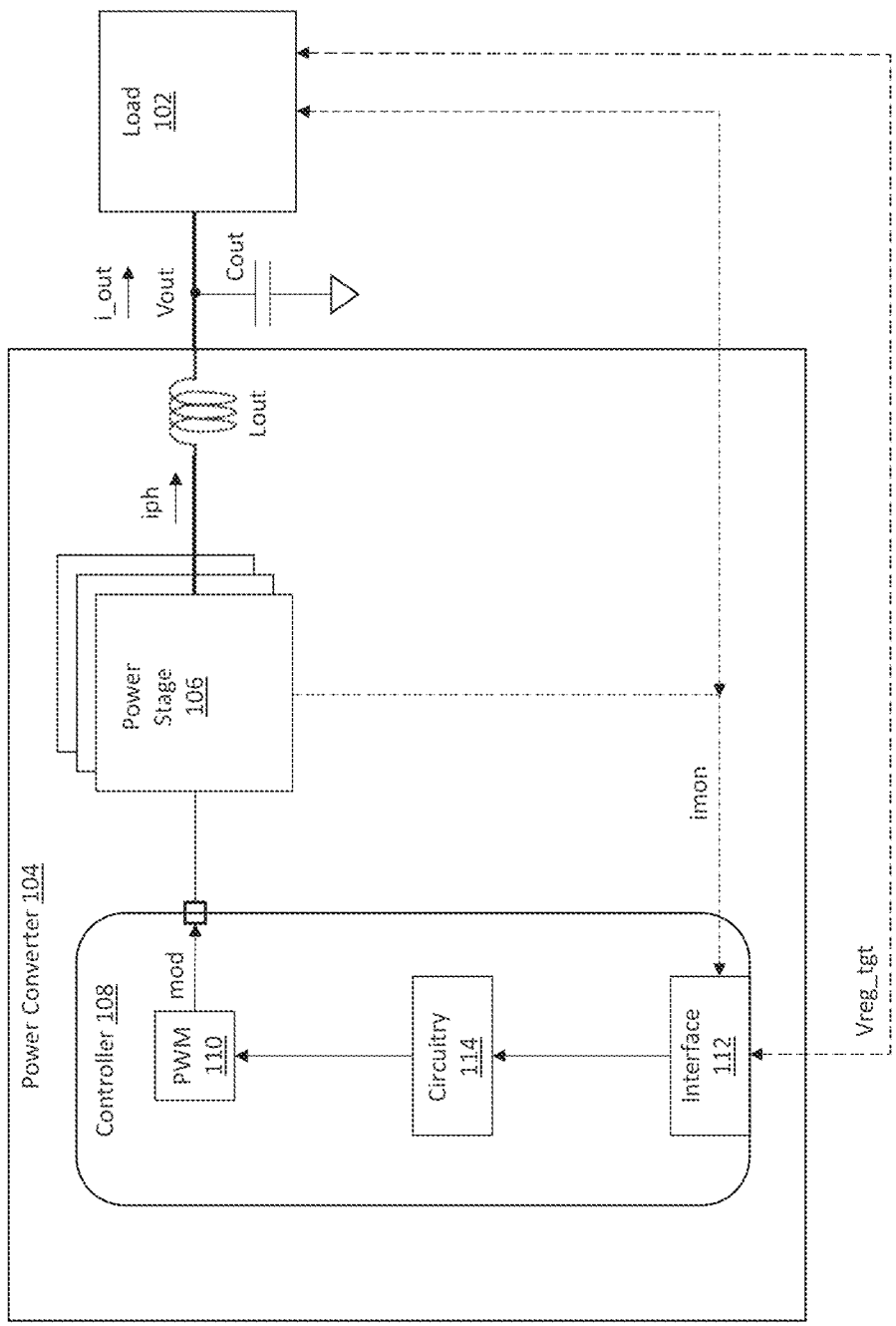
FIG. 1 illustrates a block diagram of an embodiment of an electronic system that includes a load and a power converter configured to regulate an output voltage provided to the load.

FIG. 1 illustrates an embodiment of an electronic system 100 that includes a load 102 and a power converter 104 configured to regulate an output voltage (Vout) provided to the load 102. The load 102 may be any type of electronic load requiring a regulated supply voltage. For example, the load 102 may be an Ethernet switch, an ASIC, a memory device, a processor such as a CPU, microprocessor, GPU, DSP, AI accelerator, image processor, network or packet processor, coprocessor, multi-core processor, front-end processor, baseband processor, etc. The power converter 104 is shown as a buck converter in FIG. 1 just as an example. In this example, the power converter 104 includes a plurality of power stages 106 each configured to provide a phase current (iph) to the load 102 through a respective inductor (Lout) and an output capacitor (Cout) reduces output voltage ripple.

A controller 108 configured to generate a modulation signal (mod) for controlling the phase current iph of each power stage 106 so as to regulate the output voltage Vout provided to the load 102. The power converter 104 may instead include a single phase/power stage 106. In general, the power converter 104 may be any type of power converter or voltage regulator that provides one or more regulated voltages (Vout) to the load 102. For example, the power converter 104 may be a buck converter as shown in FIG. 1, a boost converter, a buck-boost converter, a switched capacitor voltage regulator, a step-down converter, etc. and may be implemented as a power device module, as previously described herein.

The power converter controller 108 includes a modulator 110 for generating the modulation signal 'mod' for controlling the phase current iph of each power stage 106 so as to regulate the output voltage Vout provided to the load 102. In one embodiment, the modulator 110 implement pulse width modulation (PWM). The controller 108 also includes an interface 112 for receiving a signal 'Vreg_tgt' which indicates a target voltage regulation setpoint. The controller 108 overrides the default load line used as part of the voltage regulation process when the signal Vreg_tgt is active, such that the output voltage Vout follows the target voltage regulation setpoint instead of the default load line when the signal Vreg_tgt is present at the interface 112.

The interface 112 may also be used to receive information 'imon' about the load current of the load 102. The current information 'imon' is typically sensed and provided by the individual power stages 106 to the controller 108. In addition or separately, the load 102 may provide current information to the controller 108. The load 102 and controller 108 may be in direct or indirect communication, which may be one-way from the load 102 to the controller 108 or may be two-way so that the controller 108 may communicate telemetry information such as temperature, current, etc. to the load 102.

The controller 108 includes circuitry 114 configured to adjust the voltage regulation setpoint for the output voltage Vout of the power converter 104 based on the current information imon received by the controller 108. The voltage regulation setpoint determines the target/reference voltage to which the output voltage Vout of the power converter 104 is regulated. Accordingly, the output voltage Vout of the power converter 104 depends on and varies with load current by adjusting the voltage regulation setpoint based on the current information imon received by the controller 108.

The modulator 110 included in the controller 108 generates a modulation signal mod for each power stage 106 such that the output voltage Vout of the power converter 104 follows a default load line. The default load line has a slope that determines the rate of change of the output voltage Vout as a function of load current. The load current may be indicated to the controller by the current information imon received at the interface 112, e.g., as explained above. The default load line may be fixed or variable, and may have zero or non-zero slope. In each case, the controller circuitry 114 is configured to override the default load line when the signal Vreg_tgt is present at the controller interface 112, such that the output voltage Vout of the power converter 104 follows the target voltage regulation setpoint instead of the default load line when the signal Vreg_tgt is present at the interface 112.

Figure 2A:
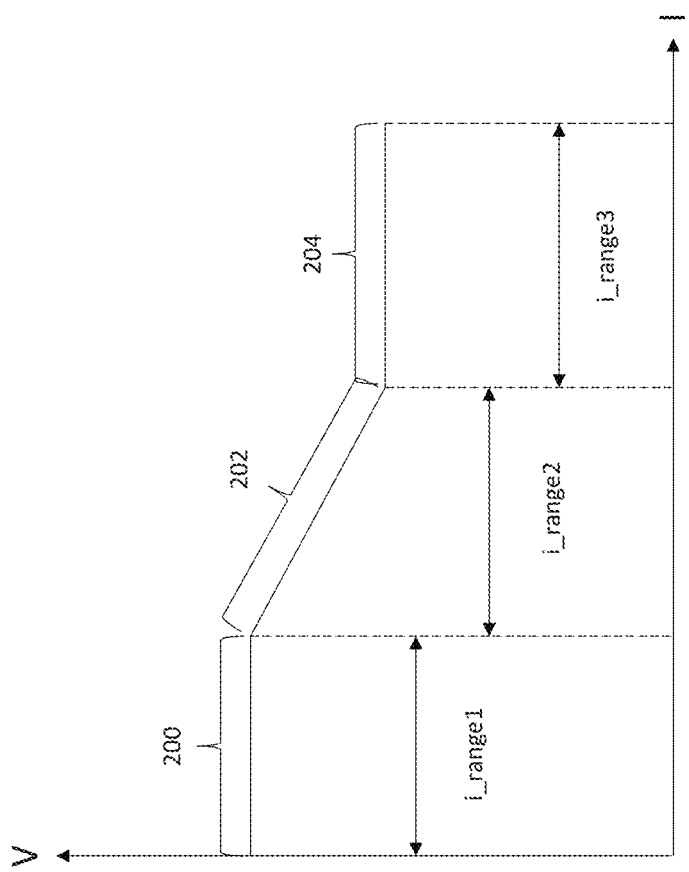
FIG. 2A illustrates an exemplary voltage regulation setpoint curve for the power converter, as a function of load current.

FIG. 2A illustrates an exemplary voltage regulation setpoint curve for the power converter 104, as a function of load current (I). In a first current range i_range1, a first voltage regulation setpoint 200 which follows a first load line with zero slope may be implemented by the controller 108. For example, in the case of an Ethernet router or similar type of network/packet processor as the load 102, the load 102 consumes less current when idle (no packet traffic). The idle state of the load 102 may correspond to the first current range i_range1. The first load line with zero slope may be implemented by the controller 108 when the load current is within the first range i_range1, as indicated by the current information imon received by the controller 108. The signal Vreg_tgt received by the controller 108 is active when the load current is within the first range i_range1, to indicate that the default load line implemented by the controller 108 should be overridden and that the output voltage Vout should follow the target voltage regulation setpoint indicated by the signal Vreg_tgt received at the controller interface 112 instead of the default load line.

When packets begin to pass through the load 102, the load current increases substantially. This state of the load 102 may correspond to a second current range i_range2 and may be indicated by the current information imon received by the controller 108. In response, the controller 108 may implement a second voltage regulation setpoint 202 which follows a linear (default) load line when the load current is within the second range i_range2. The signal Vreg_tgt received by the controller 108 is inactive when the load current is within the second range i_range2. Accordingly, the output voltage Vout follows the default load line.

For load current levels in a third range i_range3 above the second range i_range2, the controller 108 may implement a third voltage regulation setpoint 204 which follows a third load line with zero slope but at level lower than the level of the first voltage regulation setpoint 200. For example, in the case of a load overcurrent condition, the third range i_range3 may indicate the load overcurrent condition and the third voltage regulation setpoint 204 may disable the load current. The signal Vreg_tgt received by the controller 108 may be active when the load current is within the third range i_range3, to indicate that the default load line should be overridden and that the output voltage Vout should follow a new (lower) target voltage regulation setpoint instead of the default load line.

Figure 2B:
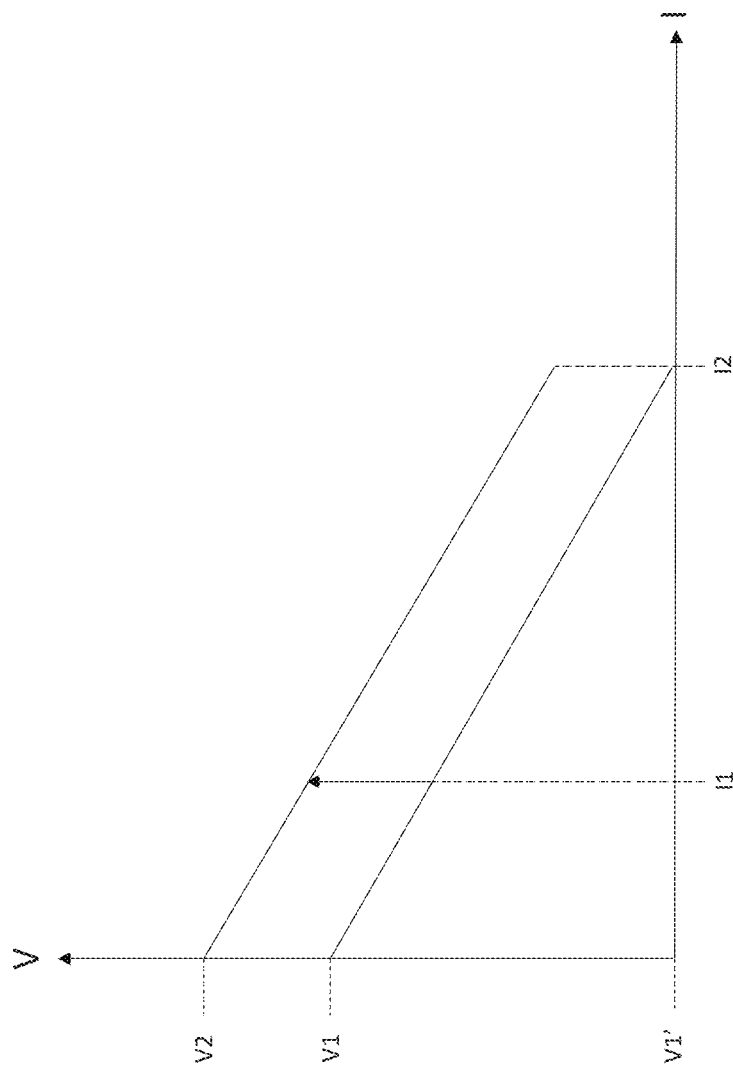
FIG. 2B illustrates another exemplary voltage regulation setpoint curve for the power converter, as a function of load current.

FIG. 2B illustrates another exemplary voltage regulation setpoint curve for the power converter 104, also as a function of load current (I). Different than FIG. 2A, the power converter 104 begins regulation at a first voltage 'V1', e.g., of 0.812V with a fixed default load line having a non-zero slope, e.g., 0.232 milliohm (mΩ) and which may be based on the current information imon received by the controller 108. The regulated output voltage Vout follows this load line until the load current reaches a value I1. At load current I1, the signal Vreg_tgt received at the controller interface 112 is active and indicates to the controller circuitry 114 that the output voltage Vout should be pulsed up to a second voltage V2'. The regulated output voltage Vout then follows the new load line, which has the same slope in the example as the default load line followed up to load current I1. With this approach, the output voltage Vout is regulated to a higher target voltage 'V2' when the load current exceeds threshold I1. This means that at higher load current I2, the regulated output voltage Vout is higher than it would have been if the default load line was followed.

As explained above, FIGS. 2A and 2B are only two examples of the voltage regulation setpoint behaviour implemented by the power converter controller 108 in response to the current information imon received by the controller 108. The voltage regulation setpoint of the power converter 104 may also be adjusted by the controller 108 in response to the received signal Vreg_tgt which indicates a target voltage setpoint for the load 102, by overriding a default load line implemented by the controller 108 based on the target voltage regulation setpoint indicated by the received signal Vreg_tgt.

The resulting load line may be linear, non-linear, parabolic, etc. and have any desired slope and/or shape. The voltage regulation setpoint adjustments implemented by the controller 108 may be stepwise as shown in FIG. 2A, or the controller 108 may instead continuously adjust the voltage regulation setpoint, e.g., as shown in FIG. 2B. In each case, the controller 108 adjusts the voltage regulation setpoint based on the current information imon received by the controller 108. The load 102 may control the modulation of the signal Vreg_tgt so as to yield the desired output voltage behaviour.

Figure 3:
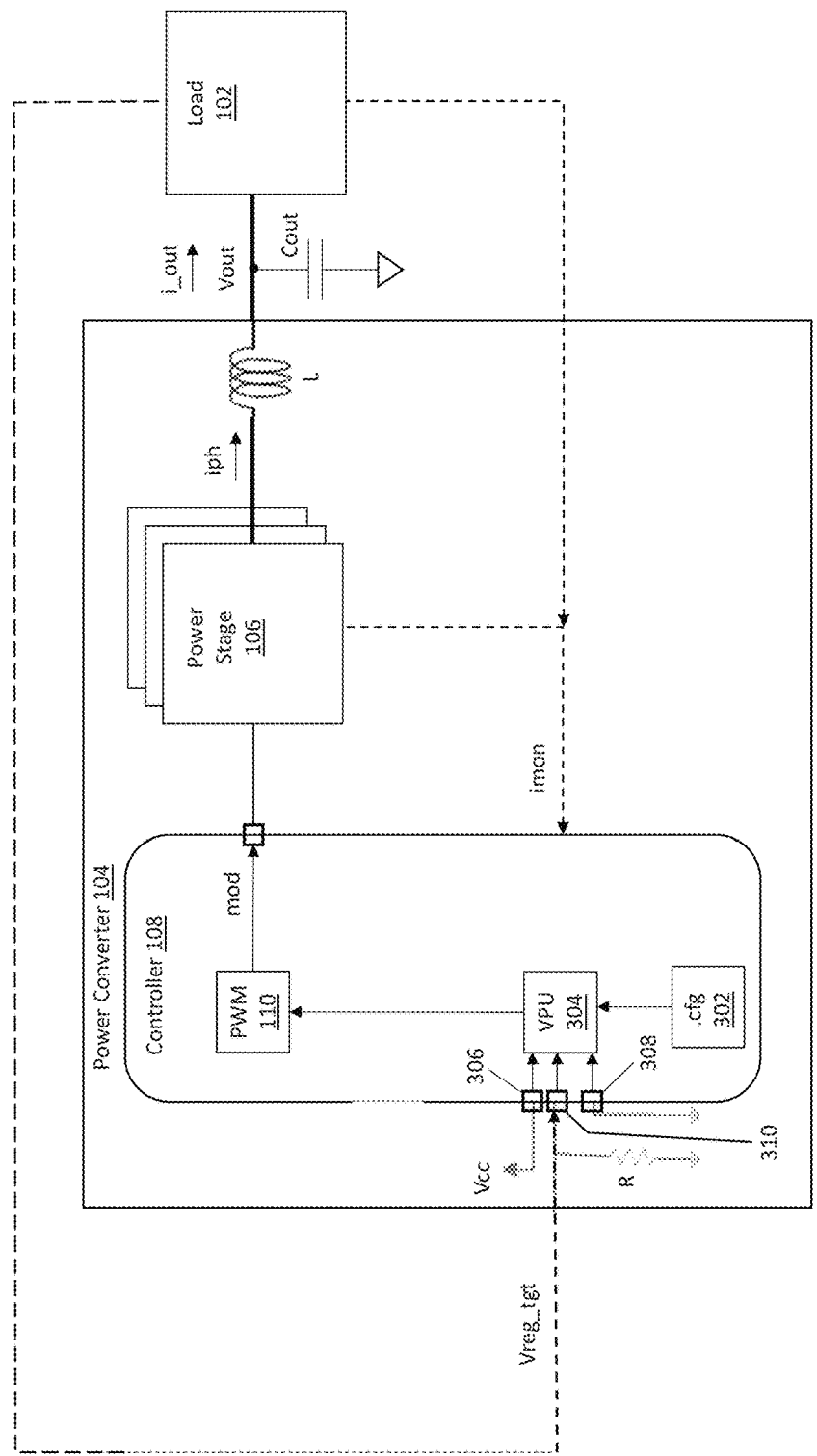
FIG. 3 illustrates a block diagram of another embodiment of an electronic system that includes a load and a power converter configured to regulate an output voltage provided to the load.

FIG. 3 illustrates another embodiment of an electronic system 300 that includes a load 102 and a power converter 104 configured to regulate an output voltage (Vout) provided to the load 102. According to this embodiment, the controller 108 is a digital controller, the modulator 110 is configured to generate the power stage modulation signals 'mod' based on a default load line which has a slope that determines the rate of change of the output voltage Vout, and the default load line is enabled in a configuration file (.cfg) 302 stored in the digital controller 108. To implement the default load line, the modulator 110 accesses the configuration file 302 and generates the power stage modulation signals 'mod' based on the default load line enabled in the configuration file 302. The default load line may be fixed in that it may be static, that is the slope of the default load line may not change over the defined operating range of the power converter 300. The current information imon received by the controller 108 may be used to vary the regulation setpoint based on the default load line.

Further according to the embodiment illustrated in FIG. 3, the controller circuitry 114 which adjusts the voltage regulation setpoint for the output voltage Vout based on the received signal Vreg_tgt includes a voltage position unit (VPU) 304. The VPU 304 is configured to override the default load line enabled in the configuration file 302, by adjusting the voltage regulation setpoint for the output voltage Vout based on the received signal Vreg_tgt. Accordingly, the default load line may be altered over some range of load current. Again in the context of an Ethernet router or similar type of network/packet processor as the load 102, the VPU 304 may override the default load line over a low load current range (e.g. i_range1 in FIG. 2A) and/or over an excessively high load current range (e.g. i_range3 in FIG. 2A). This approach effectively converts what may be a fixed linear default load line with predetermined slope into a non-linear load line with one or more regions of different slopes, e.g., as shown in FIG. 2A. One or more of the slopes may be zero (see, e.g., first and third voltage regulation setpoints 200, 204 in FIG. 2A).

Further according to the embodiment illustrated in FIG. 3, the controller interface 112 that receives the signal Vreg_tgt which indicates the target voltage regulation setpoint includes a first terminal 306 tied to a DC voltage (Vcc), a second terminal 308 tied to ground, and a third terminal 310 for receiving the signal Vreg_tgt. According to this embodiment, the interface 112 is a PWM VID (voltage ID) interface. A PWM VID interface is a unidirectional serial digital link between a processor load 102 and the power converter 104 and allows direct control of the regulated output voltage Vout. Conventionally, a processor embeds regulated voltage ID information (VID) in the duty cycle of a PWM signal and sends the PWM signal to a controller of a power converter and the controller extracts the VID information from the PWM duty cycle and sets the power converter output voltage accordingly.

According to the embodiment illustrated in FIG. 3, the load 102 encodes load current information onto the PWM signal Vreg_tgt and the controller 108 adjusts the voltage regulation setpoint for the output voltage Vout based on the PWM signal Vreg_tgt received at the PWM VID interface. A pull-down resistor 'R' may be coupled between the signal line and ground. The pull-down resistor R may be omitted. In this case, the signal line is floating. The DC voltage Vcc and corresponding terminal 306 may be omitted, and the second terminal 308 which is tied to ground may also be omitted, depending on the signalling implementation.

Figure 4:
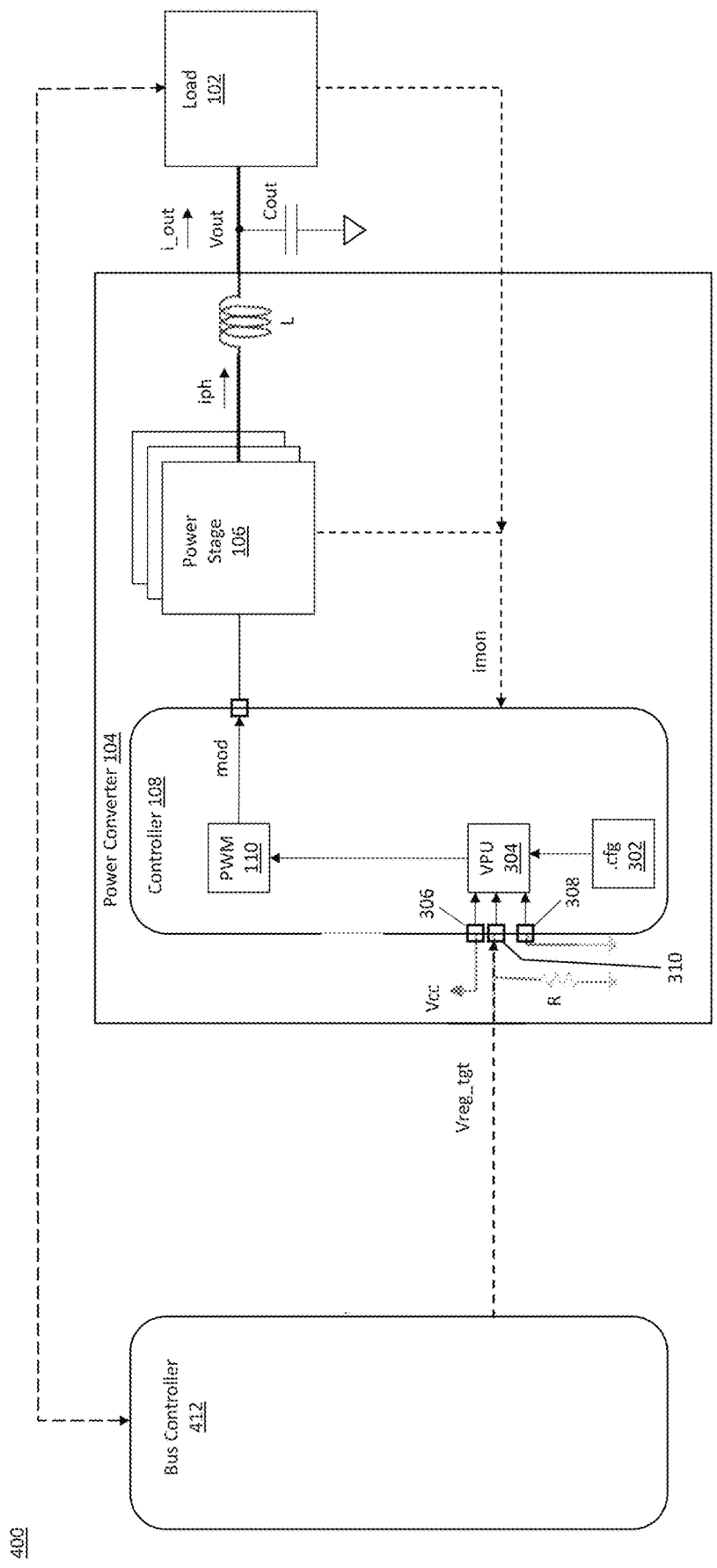
FIG. 4 illustrates a block diagram of another embodiment of an electronic system that includes a load and a power converter configured to regulate an output voltage provided to the load.

FIG. 4 illustrates another embodiment of an electronic system 400 that includes a load 102 and a power converter 104 configured to regulate an output voltage (Vout) provided to the load 102. The embodiment shown in FIG. 4 is similar to the embodiment shown in FIG. 3. Instead of the load 102 directly communicating the signal Vreg_tgt which indicates a target voltage regulation setpoint to the power converter controller 108, the electronic system 400 in FIG. 4 includes a bus controller 412 configured to communicate with the load 102 and the controller 108, and to activate the signal Vreg_tgt provided to the controller 108 based on a level of the load current. The controller terminal 310 which receives the signal Vreg_tgt is configured to receive the signal Vreg_tgt from the bus controller 412 instead of the load 102, according to this embodiment. Accordingly, the third terminal 310 which receives the signal Vreg_tgt carrying the target voltage regulation setpoint information is electrically connected to the bus controller 412 instead of the load 102. Bus controllers are well known in the art, and therefore no further explanation of the bus controller 412 shown in FIG. 4 is provided.

Figure 5:
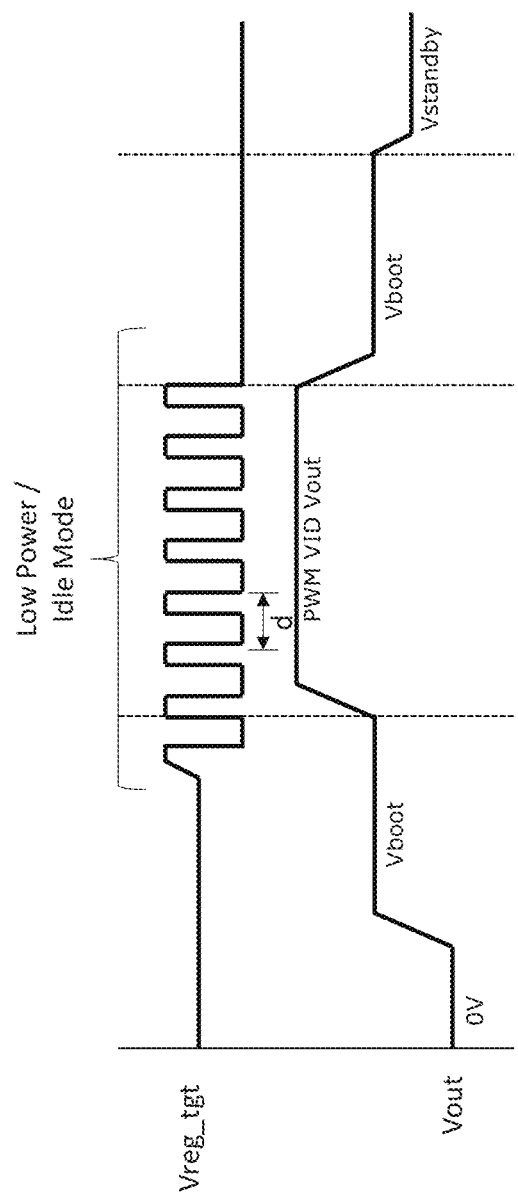
FIG. 5 illustrates waveform diagrams associated with an embodiment of a voltage regulation setpoint adjustment technique implemented by the power converter controller.

Regardless of the manner in which the signal Vreg_tgt carrying the target voltage regulation setpoint information is communicated to the power converter controller 108, the signal Vreg_tgt may be a PWM signal. As shown in FIG. 5, the load 102 may set the duty cycle of such a PWM signal to indicate a target voltage regulation setpoint for a low power or idle mode. In FIG. 5, the power converter output voltage Vout transitions from a zero volt soft-start condition ('0V') to an initial boot voltage ('Vboot') sufficient to power the load 102. If the load 102 is idle or in a low power mode, i.e. operating at a reduced load current state, the load 102 may set the duty cycle (d) of the PWM signal Vreg_tgt received at the controller interface 112 to indicate a target voltage regulation setpoint ('PWM VID Vout') for the low power/idle mode.

The VPU 304 may override the default load line by adjusting the voltage regulation setpoint for the output voltage Vout based on the duty cycle of the PWM signal Vreg_tgt, such that the power converter output voltage Vout follows the target voltage regulation setpoint indicated by the duty cycle of the received PWM signal Vreg_tgt. FIG. 2A illustrates an embodiment of this approach, in which a first duty cycle for the signal Vreg_tgt received at the interface 112 may indicate the first voltage regulation setpoint 200 and a second duty cycle for the received signal Vreg_tgt may indicate the third voltage regulation setpoint 204, where the first voltage regulation setpoint 200 may correspond to the initial boot voltage 'Vboot' and the second voltage regulation setpoint 204 may correspond to the higher voltage setpoint 'PWM VID Vout'. FIG. 2B illustrates another embodiment of this approach, in which a certain duty cycle for the signal Vreg_tgt received at the interface 112 may indicate the voltage regulation setpoint adjustment from 'V1' to 'V2' at load current I1, where 'V1' may correspond to the initial boot voltage 'Vboot' and 'V2' may correspond to the higher voltage setpoint 'PWM VID Vout'.

FIG. 5 shows an embodiment in which the VPU 304 is configured to increase the voltage regulation setpoint for the output voltage Vout from the initial boot voltage 'Vboot' to the higher voltage 'PWM VID Vout' responsive to an activation of the signal Vreg_tgt received at the corresponding controller terminal 310. The duty cycle 'd' of the activated signal Vreg_tgt causes the VPU 304 to increase the voltage regulation setpoint for the output voltage Vout from the initial boot voltage 'Vboot' to the higher voltage 'PWM VID Vout'. In response to a deactivation of the signal Vreg_tgt received at the corresponding controller terminal 310, the VPU 304 reduces the voltage regulation setpoint for the output voltage Vout from the higher voltage 'PWM VID Vout' back to the lower boot voltage 'Vboot'. The load 102 may indicate deactivation of the signal Vreg_tgt received at the controller interface 112 by setting the duty cycle of the signal Vreg_tgt to zero, or by changing the duty cycle of the signal Vreg_tgt to a different value than the one used to indicate that the voltage regulation setpoint for the output voltage Vout should be the higher voltage 'PWM VID Vout'. The VPU 304 may lower the voltage regulation setpoint to a standby level ('Vstandby') responsive to the load 102 entering a standby mode. Additional voltage regulation setpoints may be implemented by varying the duty cycle of the signal Vreg_tgt received at the corresponding controller terminal 310. The voltage regulation setpoint implemented by the controller 108 may instead be continuous, as previously described herein.

Figure 6:
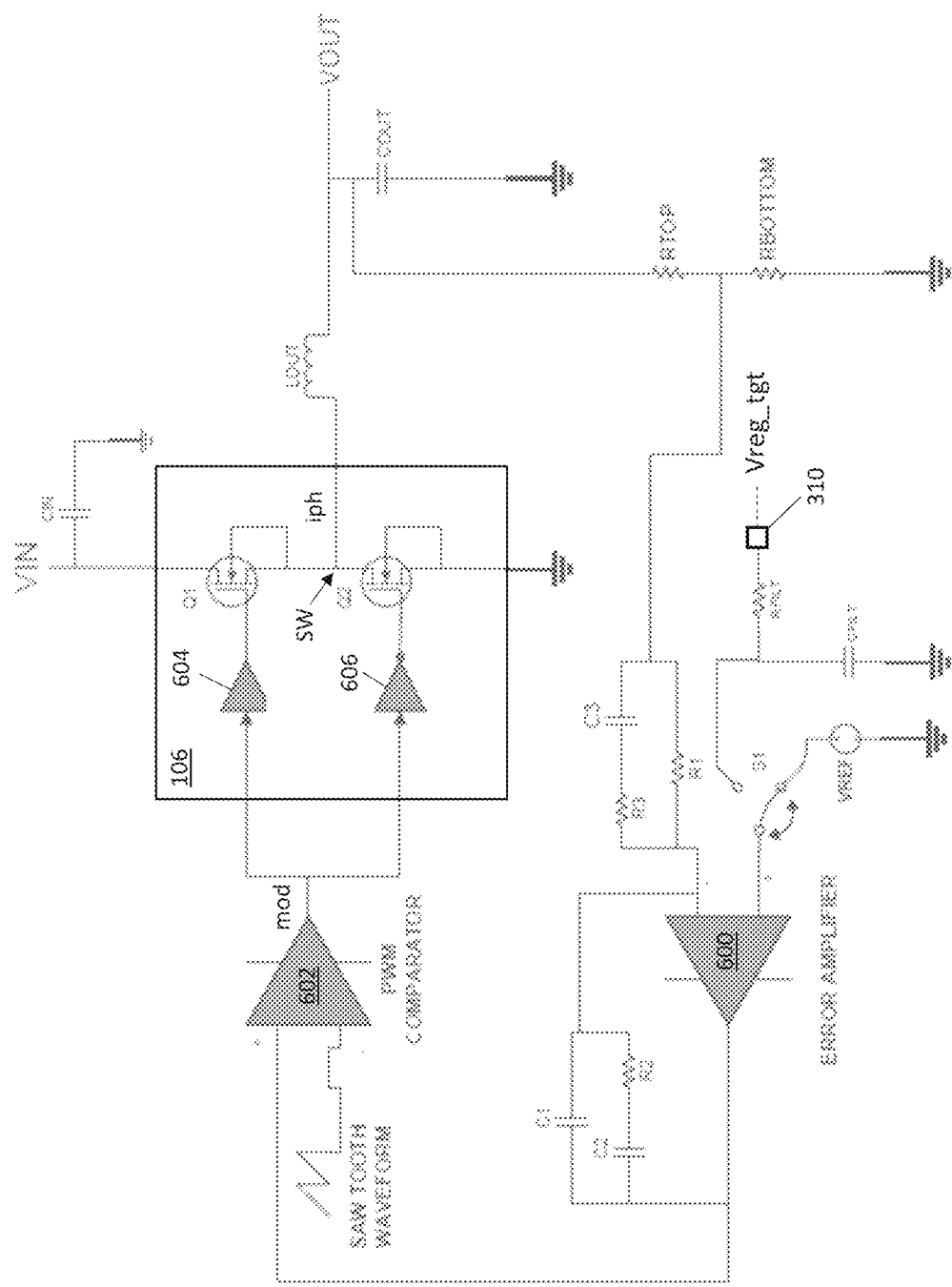
FIG. 6 illustrates a circuit schematic of an embodiment of the power converter controller.

FIG. 6 illustrates another embodiment of the power converter controller 108. According to this embodiment, the controller 108 is an analog controller and the circuitry 114 for adjusting the voltage regulation setpoint for the output voltage Vout includes a switch device S1 such as a transistor configured to select an internal reference voltage (VREF) as the voltage regulation setpoint for the output voltage Vout responsive to a deactivation of the signal Vreg_tgt received at the controller interface 112. The switch device S1 is configured to select a voltage level indicated by the signal Vreg_tgt received at the controller interface 112 as the voltage regulation setpoint for the output voltage Vout responsive to an activation of the received signal Vreg_tgt. The received signal Vreg_tgt, which indicates a target voltage regulation setpoint for the load 102, may be activated and deactivated by duty cycle control as previously described herein, by amplitude modulation, or by some other signal processing technique. The controller terminal 310 input for receiving the signal Vreg_tgt carrying the voltage setpoint information may include an RC filter RFILT, CFILT.

An error amplifier 600 compares the voltage regulation setpoint selected by the switch device S1 and the output voltage Vout after being divided down by a resistor divider formed by series-connected resistor RTOP, RBOTTOM. The error amplifier 600 may have a first RC network R1, R3, C3 at the negative input and a second RC network R2, C1, C2 at the output of the error amplifier 600. The modulator 110 of the power converter controller 108 is a PWM comparator 602, according to the embodiment illustrated in FIG. 6. The error amplifier output is coupled to the positive input of the PWM comparator 602, and the negative input of the PWM comparator 602 receives a saw tooth signal. The output of the PWM comparator 602 is a PWM signal 'mod' having a duty cycle which is based on the difference between the saw tooth signal and the error amplifier output. The PWM signal 'mod' controls the phase current iph of the corresponding power stage 106 so as to regulate the output voltage Vout provided to the load 102.

The power stage 106 includes a high-side driver 604 for driving the gate of a high-side power transistor Q1 and a low-side driver 606 for driving the gate of a low-side power transistor Q2, responsive to the PWM signal 'mod' generated by the PWM comparator 602. The high-side power transistor Q1 is coupled between a switch node (SW) and an input voltage (Vin) which may be filtered by an input capacitor (Cin). The low-side power transistor Q2 is coupled between the switch node 'SW' and a reference point such as ground. The series-connected power transistors Q1, Q2 delivers a phase current 'iph' at the switch node 'SW' for that power stage 106 to the corresponding output inductor 'Lout', in the case of a buck converter. A buck converter topology is shown merely as an example. In general, any type of power converter/voltage regulator topology may be employed for regulating the output voltage Vout provided to the load 102.

Figure 7:
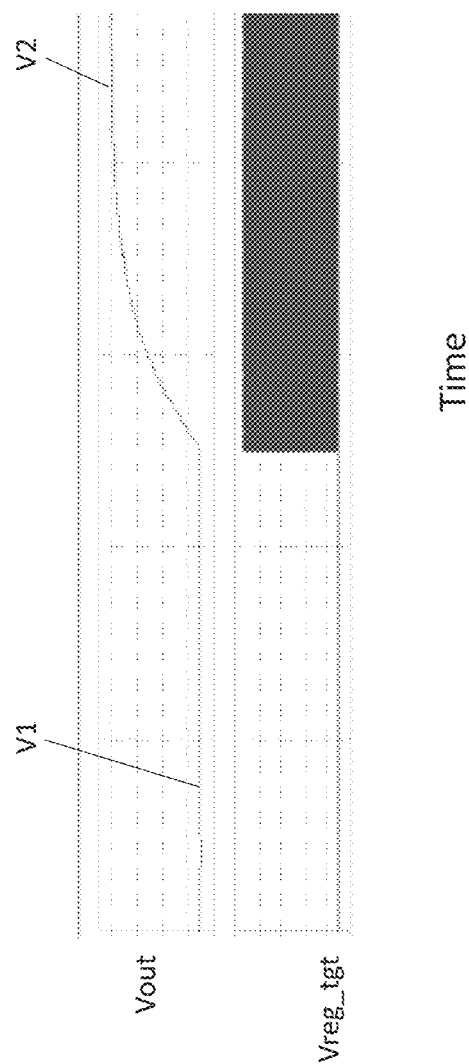
FIG. 7 illustrates the output voltage behaviour for the controller implementation shown in FIG. 6, in response to a signal by the controller and which indicates the load current.

FIG. 7 illustrates the output voltage behaviour for the analog controller implementation shown in FIG. 6, in response to the signal Vreg_tgt received at the corresponding controller terminal 310 input and which indicates a target voltage regulation setpoint for the load 102. After some ramp time, the output voltage Vout increases from a first voltage level 'V1' to a higher voltage level 'V2' when the signal Vreg_tgt received at the corresponding controller terminal 310 input is active.

Figure 8:
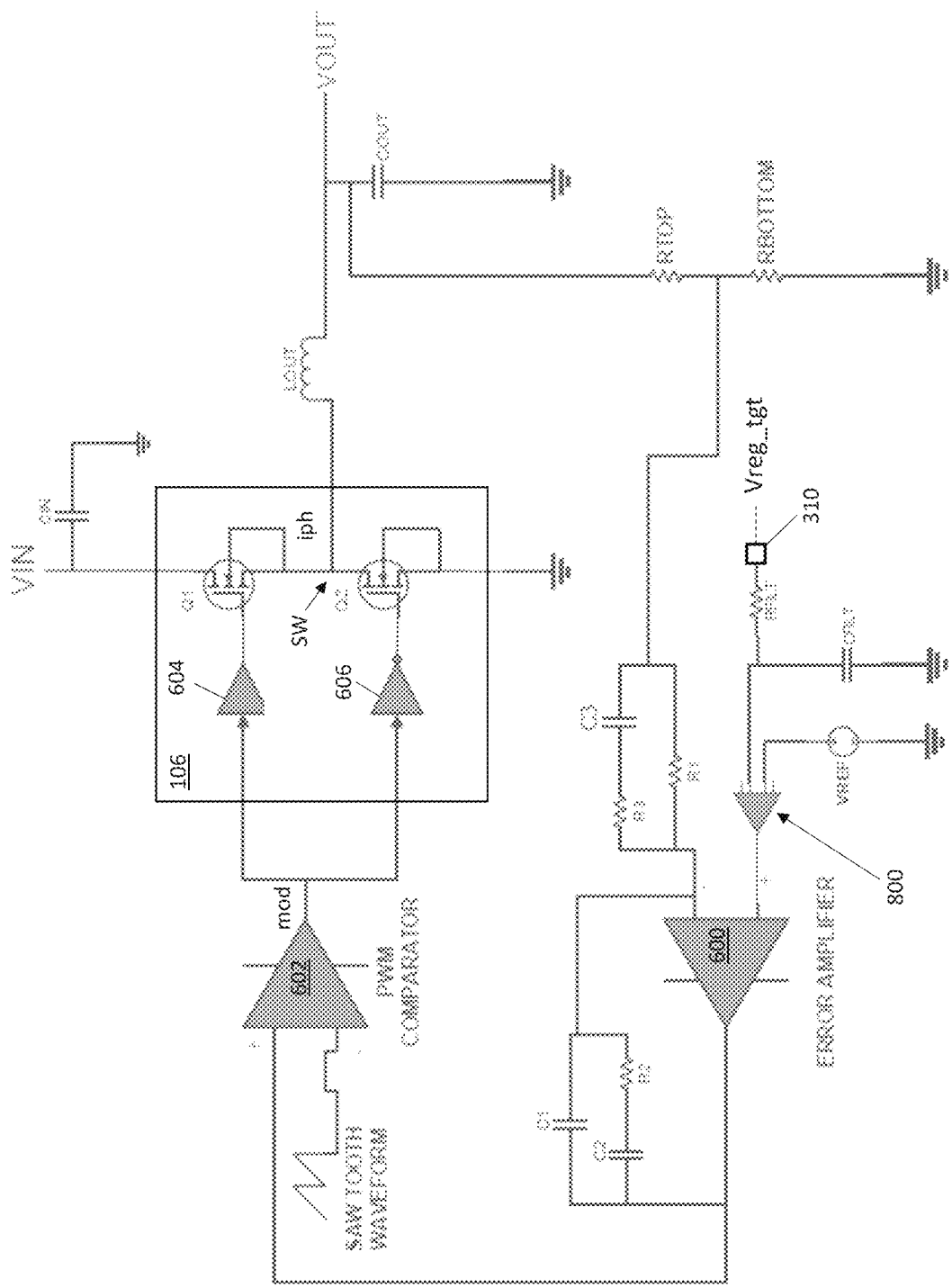
FIG. 8 illustrates a circuit schematic of another embodiment of the power converter controller.

FIG. 8 illustrates another embodiment of the power converter controller 108. The embodiment shown in FIG. 8 is similar to the embodiment shown in FIG. 6. Different, however, the circuitry 114 for adjusting the voltage regulation setpoint for the output voltage Vout includes a summing circuit 800 configured to sum a voltage value indicated by the signal Vreg_tgt received at the corresponding controller terminal 310 with an internal reference voltage (VREF) to determine the voltage regulation setpoint for the output voltage Vout when the signal Vreg_tgt is present at the corresponding controller terminal 310.

Although the present disclosure is not so limited, the following numbered examples demonstrate one or more aspects of the disclosure.

Example 1. A controller for a power converter, the controller comprising: a plurality of output terminals, each output terminal configured to output a modulation signal for controlling a phase current of a power stage of the power converter; a modulator configured to generate the modulation signals such that an output voltage of the power converter follows a load line having a slope that determines a rate of change of the output voltage as a function of load current; an interface configured to receive a signal which indicates a target voltage regulation setpoint; and circuitry configured to override the load line when the signal is present at the interface, such that the output voltage follows the target voltage regulation setpoint instead of the load line when the signal is present at the interface.

Example 2. The controller of example 1, wherein the signal received at the interface is a PWM (pulse width modulation) signal, and wherein a pulse width of the PWM signal indicates the target voltage regulation setpoint.

Example 3. The controller of examples 1 or 2, wherein the load line is fixed.

Example 4. The controller of any of examples 1 through 3, wherein the controller is a digital controller, wherein the load line is enabled in a configuration file stored in the digital controller, and wherein the circuitry comprises a voltage position unit configured to override the load line enabled in the configuration file with the target voltage regulation setpoint indicated by the signal received at the interface.

Example 5. The controller of any of examples 1 through 4, wherein the signal received at the interface has a duty cycle which indicates the target voltage regulation setpoint, and wherein the circuitry is configured to override the load line with the target voltage regulation setpoint such that the output voltage follows the target voltage regulation setpoint indicated by the duty cycle of the signal received at the interface.

Example 6. The controller of any of examples 1 through 5, wherein responsive to an activation of the signal received at the interface, the circuitry is configured to increase the voltage regulation setpoint for the output voltage from an initial voltage setting which corresponds to the load line to a higher voltage which corresponds to the target voltage regulation setpoint indicated by the signal received at the interface, and wherein responsive to a deactivation of the signal received at the interface, the circuitry is configured to reduce the voltage regulation setpoint for the output voltage from the higher voltage to the initial voltage setting.

Example 7. The controller of any of examples 1 through 3 and 5 through 6, wherein the controller is an analog controller, wherein the circuitry comprises a switch device configured to select, responsive to a deactivation of the signal received at the interface, an internal reference voltage which corresponds to the load line as the voltage regulation setpoint for the output voltage, and wherein the switch device is configured to select, responsive to an activation of the signal received at the interface, a voltage level which corresponds to the target voltage regulation setpoint indicated by the signal received at the interface as the voltage regulation setpoint for the output voltage.

Example 8. The controller of any of examples 1 through 3 and 5 through 6, wherein the controller is an analog controller, and wherein the circuitry comprises a summing circuit configured to sum a voltage value indicated by the signal received at the interface with an internal reference voltage to determine the voltage regulation setpoint for the output voltage when the signal is present at the interface.

Example 9. A method of controlling a power converter, the method comprising: generating a modulation signal for controlling a phase current of a power stage of the power converter such that an output voltage of the power converter follows a load line having a slope that determines a rate of change of the output voltage as a function of load current; receiving a signal which indicates a target voltage regulation setpoint; and overriding the load line when the signal is active, such that the output voltage follows the target voltage regulation setpoint instead of the load line when the signal is present at the interface.

Example 10. The method of example 9, wherein the load line is fixed.

Example 11. The method of examples 9 or 10, wherein the received signal has a duty cycle which indicates the target voltage regulation setpoint, and wherein overriding the load line when the signal is active comprises adjusting the voltage regulation setpoint for the output voltage based on the duty cycle of the received signal.

Example 12. The method of any of examples 9 through 11, wherein overriding the load line when the signal is active comprises: responsive to an activation of the received signal, increasing the voltage regulation setpoint for the output voltage from an initial voltage setting which corresponds to the load line to a higher voltage which corresponds to the target voltage regulation setpoint indicated by the signal received at the interface; and responsive to a deactivation of the received signal, reducing the voltage regulation setpoint for the output voltage from the higher voltage to the initial voltage setting.

Example 13. The method of any of examples 9 through 11, wherein overriding the load line when the signal is active comprises: responsive to a deactivation of the received signal, selecting an internal reference voltage which corresponds to the load line as the voltage regulation setpoint for the output voltage; and responsive to an activation of the received signal, selecting a voltage level which corresponds to the target voltage regulation setpoint indicated by the signal received at the interface.

Example 14. The method of any of examples 9 through 11, wherein overriding the load line when the signal is active comprises: summing an internal reference voltage with a voltage value which corresponds to the target voltage regulation setpoint indicated by the signal received at the interface.

Example 15. An electronic system, comprising: a load; and a power converter configured to regulate an output voltage provided to the load, the power converter comprising a plurality of power stages each configured to provide a phase current to the load, and a controller configured to generate a modulation signal for controlling the phase current of each power stage such that the output voltage follows a load line having a slope that determines a rate of change of the output voltage as a function of load current, wherein the controller is configured to receive a signal from the load which indicates a target voltage regulation setpoint, wherein the controller is configured to override the load line when the signal is present at the interface, so that the output voltage follows the target voltage regulation setpoint instead of the load line when the signal is present at the interface.

Example 16. The electronic system of example 15, further comprising a bus controller configured to communicate with the load and the controller, and to activate the signal provided to the controller based on a level of the load current.

Example 17. The electronic system of examples 15 or 16, wherein the controller comprises an interface configured to receive the signal, wherein the interface is electrically connected to the load, and wherein the load is configured to activate the signal to the interface based on a level of the load current.

Example 18. The electronic system of any of examples 15 through 17, wherein the signal received at the controller is a PWM (pulse width modulation) signal, and wherein a pulse width of the PWM signal indicates the target voltage regulation setpoint.

Example 19. The electronic system of any of examples 15 through 18, wherein the controller is a digital controller, wherein the load line is enabled in a configuration file stored in the digital controller, and wherein the controller is configured to override the load line enabled in the configuration file with the target voltage regulation setpoint indicated by the signal received by the controller.

Example 20. The electronic system of any of examples 15 through 19, wherein the signal received by the controller has a duty cycle which indicates the target voltage regulation setpoint, and wherein the controller is configured to override the load line with the target voltage regulation setpoint such that the output voltage follows the target voltage regulation setpoint indicated by the duty cycle of the signal received at the interface.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A controller for a power converter, the controller comprising:
   a plurality of output terminals, each output terminal configured to output a modulation signal for controlling a phase current of a power stage of the power converter;
   a modulator configured to generate the modulation signals such that an output voltage of the power converter follows a load line having a slope that determines a rate of change of the output voltage as a function of load current;
   an interface configured to receive a signal which indicates a target voltage regulation setpoint; and
   circuitry configured to override the load line when the signal is present at the interface, such that the output voltage follows the target voltage regulation setpoint instead of the load line when the signal is present at the interface.

2. The controller of claim 1, wherein the signal received at the interface is a PWM (pulse width modulation) signal, and wherein a pulse width of the PWM signal indicates the target voltage regulation setpoint.

3. The controller of claim 1, wherein the load line is fixed.

4. The controller of claim 1, wherein the controller is a digital controller, wherein the load line is enabled in a configuration file stored in the digital controller, and wherein the circuitry comprises a voltage position unit configured to override the load line enabled in the configuration file with the target voltage regulation setpoint indicated by the signal received at the interface.

5. The controller of claim 1, wherein the signal received at the interface has a duty cycle which indicates the target voltage regulation setpoint, and wherein the circuitry is configured to override the load line with the target voltage regulation setpoint such that the output voltage follows the target voltage regulation setpoint indicated by the duty cycle of the signal received at the interface.

6. The controller of claim 1, wherein responsive to an activation of the signal received at the interface, the circuitry is configured to increase the voltage regulation setpoint for the output voltage from an initial voltage setting which corresponds to the load line to a higher voltage which corresponds to the target voltage regulation setpoint indicated by the signal received at the interface, and wherein responsive to a deactivation of the signal received at the interface, the circuitry is configured to reduce the voltage regulation setpoint for the output voltage from the higher voltage to the initial voltage setting.

7. The controller of claim 1, wherein the controller is an analog controller, wherein the circuitry comprises a switch device configured to select, responsive to a deactivation of the signal received at the interface, an internal reference voltage which corresponds to the load line as the voltage regulation setpoint for the output voltage, and wherein the switch device is configured to select, responsive to an activation of the signal received at the interface, a voltage level which corresponds to the target voltage regulation setpoint indicated by the signal received at the interface as the voltage regulation setpoint for the output voltage.

8. The controller of claim 1, wherein the controller is an analog controller, and wherein the circuitry comprises a summing circuit configured to sum a voltage value indicated by the signal received at the interface with an internal reference voltage to determine the voltage regulation setpoint for the output voltage when the signal is present at the interface.

9. A method of controlling a power converter, the method comprising:
generating a modulation signal for controlling a phase current of a power stage of the power converter such that an output voltage of the power converter follows a load line having a slope that determines a rate of change of the output voltage as a function of load current;
receiving a signal which indicates a target voltage regulation setpoint; and
overriding the load line when the signal is active, such that the output voltage follows the target voltage regulation setpoint instead of the load line when the signal is active.

10. The method of claim 9, wherein the load line is fixed.

11. The method of claim 9, wherein the received signal has a duty cycle which indicates the target voltage regulation setpoint, and wherein overriding the load line when the signal is active comprises adjusting the voltage regulation setpoint for the output voltage based on the duty cycle of the received signal.

12. The method of claim 9, wherein overriding the load line when the signal is active comprises:
responsive to an activation of the received signal, increasing the voltage regulation setpoint for the output voltage from an initial voltage setting which corresponds to the load line to a higher voltage which corresponds to the target voltage regulation setpoint indicated by the received signal; and
responsive to a deactivation of the received signal, reducing the voltage regulation setpoint for the output voltage from the higher voltage to the initial voltage setting.

13. The method of claim 9, wherein overriding the load line when the signal is active comprises:
responsive to a deactivation of the received signal, selecting an internal reference voltage which corresponds to the load line as the voltage regulation setpoint for the output voltage; and
responsive to an activation of the received signal, selecting a voltage level which corresponds to the target voltage regulation setpoint indicated by the received signal.

14. The method of claim 9, wherein overriding the load line when the signal is active comprises:
summing an internal reference voltage with a voltage value which corresponds to the target voltage regulation setpoint indicated by the received signal.

15. An electronic system, comprising:
a load; and
a power converter configured to regulate an output voltage provided to the load, the power converter comprising a plurality of power stages each configured to provide a phase current to the load, and a controller configured to generate a modulation signal for controlling the phase current of each power stage such that the output voltage follows a load line having a slope that determines a rate of change of the output voltage as a function of load current,
wherein the controller is configured to receive a signal from the load which indicates a target voltage regulation setpoint,
wherein the controller is configured to override the load line when the signal is active, so that the output voltage follows the target voltage regulation setpoint instead of the load line when the signal is active.

16. The electronic system of claim 15, further comprising a bus controller configured to communicate with the load and the controller, and to activate the signal provided to the controller based on a level of the load current.

17. The electronic system of claim 15, wherein the controller comprises an interface configured to receive the signal, wherein the interface is electrically connected to the load, and wherein the load is configured to activate the signal to the interface based on a level of the load current.

18. The electronic system of claim 15, wherein the signal received at the controller is a PWM (pulse width modulation) signal, and wherein a pulse width of the PWM signal indicates the target voltage regulation setpoint.

19. The electronic system of claim 15, wherein the controller is a digital controller, wherein the load line is enabled in a configuration file stored in the digital controller, and wherein the controller is configured to override the load line enabled in the configuration file with the target voltage regulation setpoint indicated by the signal received by the controller.

20. The electronic system of claim 15, wherein the signal received by the controller has a duty cycle which indicates the target voltage regulation setpoint, and wherein the controller is configured to override the load line with the target voltage regulation setpoint such that the output voltage follows the target voltage regulation setpoint indicated by the duty cycle of the signal received by the controller.

* * * * *